(12) United States Patent
Kitaura et al.

(10) Patent No.: US 8,419,325 B2
(45) Date of Patent: Apr. 16, 2013

(54) TOOL UNCLAMPING DEVICE

(75) Inventors: Ichiro Kitaura, Itami (JP); Yoshihiro Machida, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 1354 days.

(21) Appl. No.: 11/794,378

(22) PCT Filed: Sep. 15, 2006

(86) PCT No.: PCT/JP2006/018380
§ 371 (c)(1),
(2), (4) Date: Jun. 28, 2007

(87) PCT Pub. No.: WO2007/034746
PCT Pub. Date: Mar. 29, 2007

(65) Prior Publication Data
US 2007/0290459 A1    Dec. 20, 2007

(30) Foreign Application Priority Data

Sep. 20, 2005  (JP) ................................. 2005-272201
Oct. 18, 2005  (JP) ................................. 2005-303303

(51) Int. Cl.
*B23C 5/26*   (2006.01)

(52) U.S. Cl.
USPC ...................................... 409/233; 408/239 R

(58) Field of Classification Search .................. 409/231, 409/232, 233; 408/239 A, 239 R
See application file for complete search history.

(56) References Cited

U.S. PATENT DOCUMENTS

| | | | | |
|---|---|---|---|---|
| 5,626,448 | A | * | 5/1997 | Huang et al. ................. 409/233 |
| 5,957,029 | A | * | 9/1999 | Boyer et al. ..................... 92/5 R |
| 6,179,533 | B1 | | 1/2001 | Sun et al. |
| 6,431,803 | B1 | * | 8/2002 | Chu ............................... 409/233 |
| 2006/0188353 | A1 | * | 8/2006 | Nakamura et al. ............ 409/233 |
| 2010/0089047 | A1 | * | 4/2010 | Kitaura ........................... 60/369 |

FOREIGN PATENT DOCUMENTS

| | | |
|---|---|---|
| DE | 4015261 A1 | 11/1990 |
| GB | 1 493 887 | 11/1977 |
| JP | 6-63806 A | 3/1994 |
| JP | 7-100704 A | 4/1995 |
| JP | 7-276114 A | 10/1995 |
| JP | 11-77468 A | 3/1999 |
| JP | 2002-66814 A | 3/2002 |
| JP | 2002-126916 A * | 5/2002 |
| JP | 2005-319488 A | 11/2005 |

OTHER PUBLICATIONS

Machine Translation of Japanese Patent No. 11-077468-A published Mar. 23, 1999.*
Machine Translation of JP 07-100704, which JP '704 was published Apr. 1995.*
Machine Translation of JP 2002-126916, which JP '916 was published May 2002.*

* cited by examiner

*Primary Examiner* — Erica E Cadugan
(74) *Attorney, Agent, or Firm* — Birch, Stewart, Kolasch & Birch, LLP

(57) ABSTRACT

A tool unclamping device is a device capable of unclamping a tool clamped to a spindle of a machine tool, and comprises a casing, an output shaft set on this casing and capable of outputting power necessary for unclamping the tool, a motor serving as a power source capable of supplying power for driving the output shaft, a power transmission mechanism transmitting the power from the motor to the output shaft and a gas cylinder serving as an auxiliary power source capable of supplying auxiliary power to this power transmission mechanism.

7 Claims, 13 Drawing Sheets

TOOL UNCLAMPING DEVICE

TECHNICAL FIELD

The present invention relates to a tool unclamping device, and more specifically, it relates to a tool unclamping device capable of releasing and unclamping a tool clamped to a spindle when exchanging a tool mounted on the spindle of a machine tool.

BACKGROUND ART

A machine tool comprising a tool magazine storing tools and a tool changer capable of automatically exchanging a tool is known in general. The spindle of such a machine tool has a structure capable of automatically attaching/detaching a tool so that the tool changer can automatically exchange the tool mounted on the spindle.

In order to exchange the tool mounted on the spindle of the machine tool, it is necessary to release the tool from the spindle of the machine tool through a tool attaching/detaching device. Japanese Patent Laying-Open No. 6-63806 describes an exemplary tool attaching/detaching device.

Patent Document 1: Japanese Patent Laying-Open No. 6-63806

DISCLOSURE OF THE INVENTION

Problems to be Solved by the Invention

The tool attaching/detaching device described in Japanese Patent Laying-Open No. 6-63806 releases a tool holder by rotating a cam with an electric motor and mechanically pushing down a drawbar, whereby responsiveness is improved and the device can operate at a higher speed as compared with a case of driving the drawbar with a hydraulic cylinder.

In order to drive the drawbar with only the driving force from the electric motor, however, it is necessary to use a large-sized motor capable of high output. Therefore, the degree of freedom of the position for setting the motor is reduced, and the size of the tool attaching/detaching device is disadvantageously increased.

In other words, the conventional tool attaching/detaching device releases the tool holder only with the power from a single driving source, whereby not only the degree of freedom of the position for setting the driving source is reduced but also the size of the tool attaching/detaching device itself is disadvantageously increased.

The present invention has been proposed in order to solve the aforementioned problem, and an object thereof is to provide a high-output compactifiable tool unclamping device.

Means for Solving the Problems

The tool unclamping device according to the present invention is a device capable of unclamping a tool clamped to a spindle of a machine tool, and comprises a casing, an output shaft set on the casing and capable of outputting power necessary for unclamping the tool, a power source capable of supplying power for driving the output shaft, a power transmission mechanism transmitting the power from the power source to the output shaft and an auxiliary power source capable of supplying auxiliary power to this power transmission mechanism.

The aforementioned power source preferably includes a motor which is an element capable of supplying mechanical force as the power. As the auxiliary power, on the other hand, mechanical force may be supplied, or force other than the mechanical force may be supplied. The magnitude of the auxiliary power, typically smaller than that of the power from the power source, may be equivalent to that of the power from the power source.

The aforementioned auxiliary power source preferably supplies at least single force selected from pressure from a fluid, elastic force from an elastic member and electromagnetic force to the power transmission mechanism as the auxiliary power. The aforementioned auxiliary-power source more preferably includes a gas cylinder supplying pressure from internally stored gas to the power transmission mechanism.

The aforementioned power transmission mechanism preferably has an eccentric cam, rotated/driven by the power from the power source, capable of directly or indirectly reciprocating the output shaft by pressing the output shaft, a crank arm provided coaxially with the eccentric cam, a coupling member such as a coupling pin provided on the crank arm and a rotatable lever mechanically connected to the crank arm through the coupling member. In this case, the auxiliary power from the auxiliary power source preferably acts on the lever. However, it is also conceivable that the auxiliary power from the auxiliary power source acts on an element in the power transmission mechanism other than the lever.

The aforementioned lever is preferably provided with a branch so that the auxiliary power from the auxiliary power source acts on this branch. Further, the aforementioned lever may be provided with a recess receiving the coupling member. In this case, this recess preferably includes a first portion receiving the coupling member when clamping the tool and a second portion extending in a direction intersecting with the extensional direction of this first portion for receiving the coupling member when unclamping the tool.

The aforementioned power transmission mechanism preferably includes a first eccentric cam pressing the output shaft and a second eccentric cam provided coaxially or uncoaxially with this first eccentric cam for transmitting the auxiliary power from the auxiliary power source to the first eccentric cam. The power transmission mechanism may include a lever, rotatably set between the auxiliary power source and the second eccentric cam, having a pressing portion at the center. In this case, the auxiliary power from the auxiliary power source acts on the end of the lever so that the auxiliary power acts on the second eccentric cam through the pressing portion. A recess partially receiving the pressing portion is preferably provided on the surface of the second eccentric cam.

Effects of the Invention

The tool unclamping device according to the present invention, comprising the power source and the auxiliary power source, can utilize the power from these power sources. Thus, no large-sized single power source capable of high output may be employed but the degree of freedom of the positions for setting the power sources can be improved and the power sources can be miniaturized. Consequently, a high-output compactified tool unclamping device is obtained.

Figure 1:
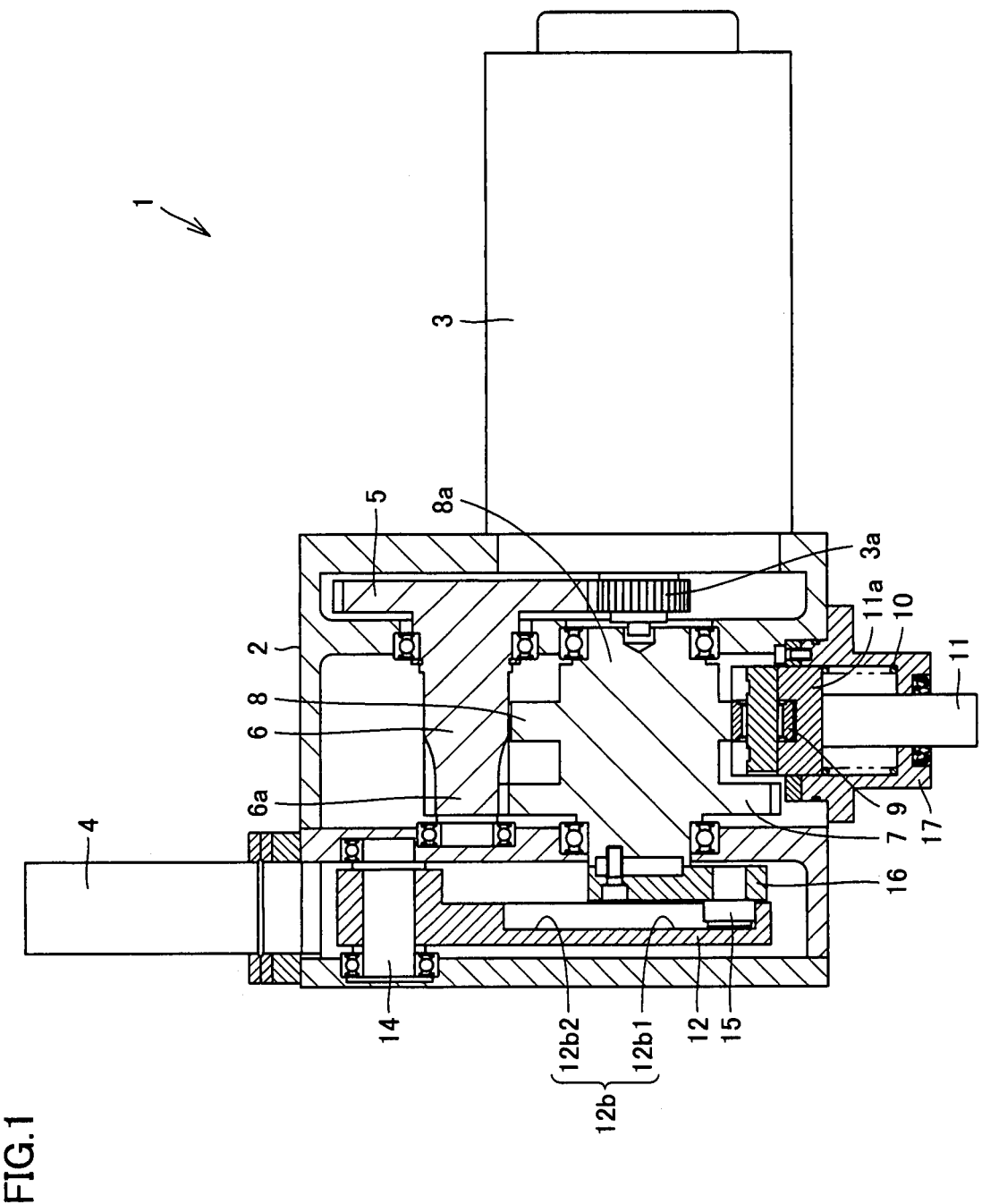
FIG. 1 is a partially fragmented plan view showing a tool unclamping device according to an embodiment of the present invention.

DESCRIPTION OF REFERENCE NUMERALS 1 tool unclamping device, 2, 4a casing, 3 motor, 3a drive shaft, 4 gas cylinder, 4b gas storage space, 4c pressing portion, 5, 6a, 7 gear, 6, 8a rotary shaft, 8 eccentric cam, 9, 13, 30, 39 cam follower, 10, 34 coiled spring, 11 output shaft, 11a large-diametral portion, 11b recess, 11c leg, 12, 31 lever, 12a branch, 12b, 40a, 40b recess, 12b1 first portion, 12b2 second portion, 14, 38 shaft portion, 15 coupling pin, 16 crank arm, 17 projecting wall, 18 spindle, 19 drawbar, 20 spindle head, 21 disc spring, 22 collet, 23 pull stud, 24 tool holder, 25 tool, 26 ball, 27 recess, 28, 29 arrow, 32 auxiliary eccentric cam, 33 frame, 35 plate, 36 support bolt, 37 pressing portion, 41 holding member, 42 support member.

BEST MODES FOR CARRYING OUT THE INVENTION

Figure 2:
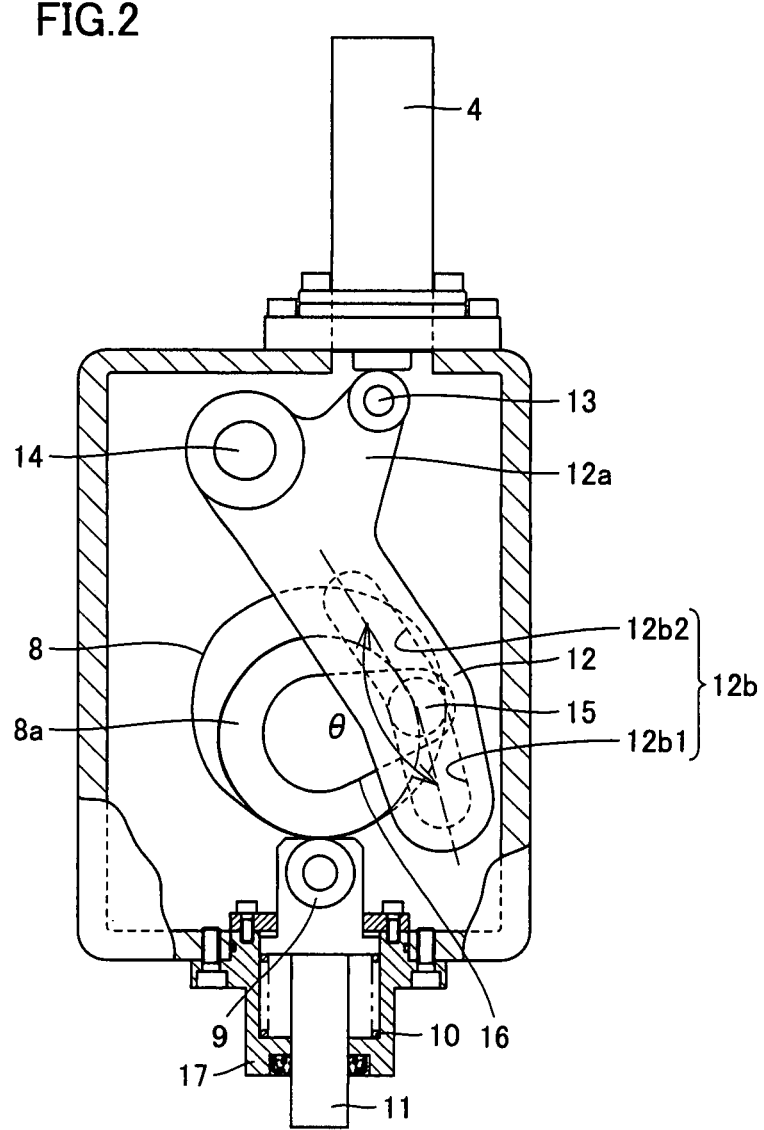
FIG. 2 is a partially fragmented side elevational view of the tool unclamping device shown in FIG. 1.

An embodiment of the present invention is now described with reference to FIGS. 1 to 10. FIG. 1 is a partially fragmented plan view of a tool unclamping device according to the embodiment of the present invention, and FIG. 2 is a partially fragmented side elevational showing a characteristic internal structure of the tool unclamping device according to this embodiment.

The tool unclamping device according to this embodiment is a device capable of unclamping a tool mounted on a spindle of a machine tool from a clamped state, typically a device having a function of unclamping a tool mounted on a spindle of a machine tool from a clamped state by supplying force output from an output portion to another member.

As shown in FIG. 1, a tool unclamping device 1 according to this embodiment comprises a casing 2, an output shaft 11 set on this casing 2 and capable of outputting power necessary for unclamping a tool from a clamped state, a motor (power source) 3 capable of supplying power for driving output shaft 11, a power transmission mechanism transmitting the power from motor 3 to output shaft 11 and a gas cylinder (auxiliary power source) 4 capable of supplying auxiliary power to the power transmission mechanism.

According to this embodiment, as hereinabove described, tool unclamping device 1 comprises motor 3 serving as the power source and gas cylinder 4 serving as the auxiliary power source. In other words, tool unclamping device 1 according to this embodiment comprises a plurality of power sources. Therefore, the device can utilize the power from the plurality of power sources, to require no single large-sized power source capable of high output. Consequently, the degree of freedom of the positions for setting motor 3 and gas cylinder 4 serving as the power sources can be improved, while motor 3 and gas cylinder 4 themselves can be miniaturized. Consequently, high-output compactified tool unclamping device 1 is obtained.

Further, motor 3 capable of generating mechanical force is so employed as the power source that no facilities such as various pipes, valves and tanks are required but the equipment can be simplified and compact. In addition, responsiveness can also be improved, and a problem of hydraulic leakage can be avoided.

Gas cylinder 4 serving as the auxiliary power source is set as hereinabove described, whereby a relatively small gear motor of 400 W is usable as motor 3. This motor is so compact and lightweight that motor 3 can be set on a spindle unit. This motor 3 has a drive shaft 3a, and a gear is formed on the outer periphery of this drive shaft 3a.

The power transmission mechanism has a rotary shaft 6, another rotary shaft 8a, an eccentric cam 8, a cam follower 9, a lever 12, shaft portion 14, another cam follower 13, a coupling pin (coupling member) 15 and a crank arm 16.

Rotary shaft 6 transmits the power from motor 3 to rotary shaft 8a. This rotary shaft 6 is provided with a gear (reduction gear) 5 meshing with the gear provided on the outer periphery of drive shaft 3a of motor 3 on a first end and a gear 6a on a second end. Rotary shaft 8a has a gear 7 meshing with gear 6a provided on the second end of rotary shaft 6 and eccentric cam 8.

Eccentric cam 8 is rotated/driven by the power from motor 3 to press and reciprocate output shaft 11. This eccentric cam 8, provided with a large-diametral portion (bulging portion bulging outward in the radial direction: pressing portion) having a relatively large radius and a small-diametral portion having a relatively small radius, can advance output shaft 11 downward by pressing output shaft 11 with the large-diametral portion, and can retreat output shaft 11 upward when the small-diametral portion is located on output shaft 11. While eccentric cam 8 and output shaft 11 are mechanically connected with each other through a connecting mechanism so that output shaft 11 indirectly pressed by eccentric cam 8 through the connecting mechanism is forwardly/backwardly movable (reciprocative) in the example shown in FIG. 1, eccentric cam 8 may alternatively directly press and reciprocate output shaft 11. While any element capable of transmitting the power between eccentric cam 8 and output shaft 11 is employable as the connecting mechanism mechanically connecting eccentric cam 8 and output shaft 11 with each other, cam follower 9 is set as part of the aforementioned connecting mechanism in the example shown in FIG. 1. This cam follower 9 is provided between eccentric cam 8 and output shaft 11, and includes a shaft portion and a rotatable ringlike member mounted on the outer periphery of this shaft portion.

As shown in FIGS. 1 and 2, lever 12 is rotatably provided around a shaft portion 14, and has a recess 12b receiving coupling pin 15. This recess 12b has a bent shape, and is provided with first and second portions 12b1 and 12b2. First and second portions 12b1 and 12b2 are both linear, and second portion 12b2 extends in a direction intersecting with the extensional direction of first portion 12b1. The angle θ formed by these first and second portions 12b1 and 12b2 is about 150°, for example.

Recess 12b has the bent shape as hereinabove described, so that coupling pin 15 can be guided to a proper position in operations for clamping and unclamping the tool. More specifically, coupling pin 15 is received in first portion 12b1 so that coupling pin 15 can be moved along this first portion 12b1 in the operation of clamping the tool, while coupling pin 15 is received in second portion 12b2 so that coupling pin 15 can be moved along this second portion 12b2 in the operation of unclamping the tool. While the case of providing recess 12b receiving coupling pin 15 on lever 12 in the example shown in FIGS. 1 and 2, a through hole can alternatively be provided in place of recess 12b.

Lever 12 has a branch (protrusion) 12a, as shown in FIG. 2. This branch 12a is so provided as to protrude from the body of lever 12, and has cam follower 13 in the vicinity of the forward end. According to this embodiment, the auxiliary power from gas cylinder 4 acts on this branch 12a. However, it is also conceivable that the auxiliary power acts on a portion of lever 12 other than branch 12a. It is further conceivable that the auxiliary power from gas cylinder 4 acts on an element, provided in the power transmission mechanism, other than lever 12.

Crank arm 16 is provided coaxially with eccentric cam 8, and the aforementioned coupling pin 15 is provided on this crank arm 16. Crank arm 16 and lever 12 are mechanically connected with each other through this coupling pin 15. As shown in FIGS. 1 and 2, coupling pin 15 is constituted of the ringlike member rotatably mounted on the outer periphery of the shaft portion mounted on crank arm 16. While coupling pin 15 is employed as an exemplary coupling member coupling crank arm 16 and lever 12 with each other, any element can be employed in place of coupling pin 15 so far as this element is capable of coupling crank arm 16 and lever 12 with each other.

Figure 10:
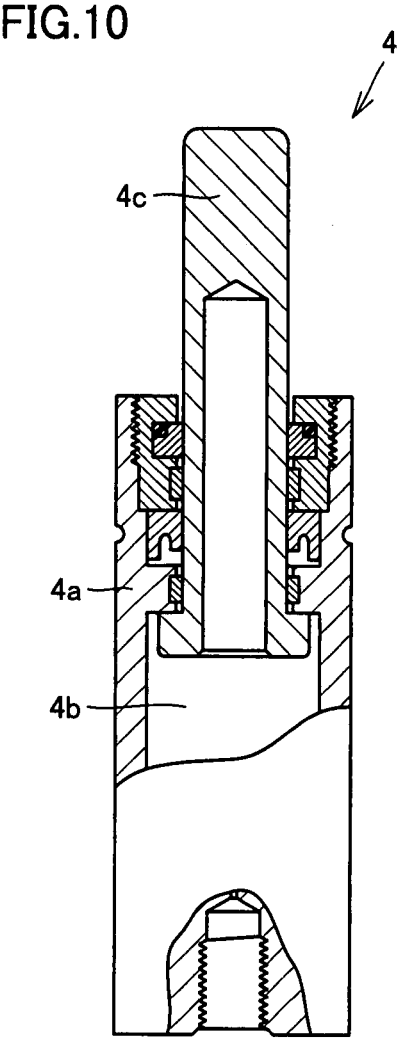
FIG. 10 is a partially fragmented sectional view showing an exemplary structure of a gas cylinder.

While the auxiliary power applied to the power transmission mechanism may be mechanical force, force other than the mechanical force may alternatively be supplied. According to this embodiment, gas cylinder 4 is provided as the auxiliary power source, so that pressure from gas acts on the power transmission mechanism as the auxiliary power. FIG. 10 shows an exemplary structure of this gas cylinder 4.

As shown in FIG. 10, gas cylinder 4 includes a casing 4a, a gas storage space 4b and a pressing portion 4c. Gas storage space 4b is filled with gas such as nitrogen gas, for example. The initial filling pressure of this gas can be set to about 3 to 14 Mpa, for example. Pressing portion 4c is forwardly/backwardly movably (reciprocatively) mounted on the casing, so that desired cushioning force responsive to the stroke of pressing portion 4c is obtained. A miniature and lightweight gas cylinder having a height of about 50 mm to 200 mm, a width of about 30 mm to 40 mm and a mass of about 0.2 kg to 1 kg can be used as this gas cylinder 4.

It is also conceivable that elastic force from an elastic member, electromagnetic force or combinational force thereof is used as the auxiliary power in place of the aforementioned pressure from a fluid. For example, an elastic member such as a spring can be employed in place of gas cylinder 4. The magnitude of the auxiliary power obtained from gas cylinder 4 or the like, typically smaller than that of the power from motor 3, may be substantially equivalent to the magnitude of the power from motor 3.

Output shaft 11 is forwardly/backwardly movably (reciprocatively) mounted on a projecting wall 17 so provided as to protrude from casing 2 in the example shown in FIGS. 1 and 2. Projecting wall 17 protrudes from casing 2 to form a spring storage space therein, and an elastic member such as a coiled spring 10 is set in this projecting wall 17. More detailedly, coiled spring 10 is set between a large-diametral portion (base portion) 11a mounted on an end of output shaft 11 and a forward end bent in projecting wall 17, to regularly urge output shaft 11 toward the inner side of casing 2.

Exemplary structures of the spindle of the machine tool actually clamping the tool and a portion around the same are now described with reference to FIG. 3.

Figure 3:
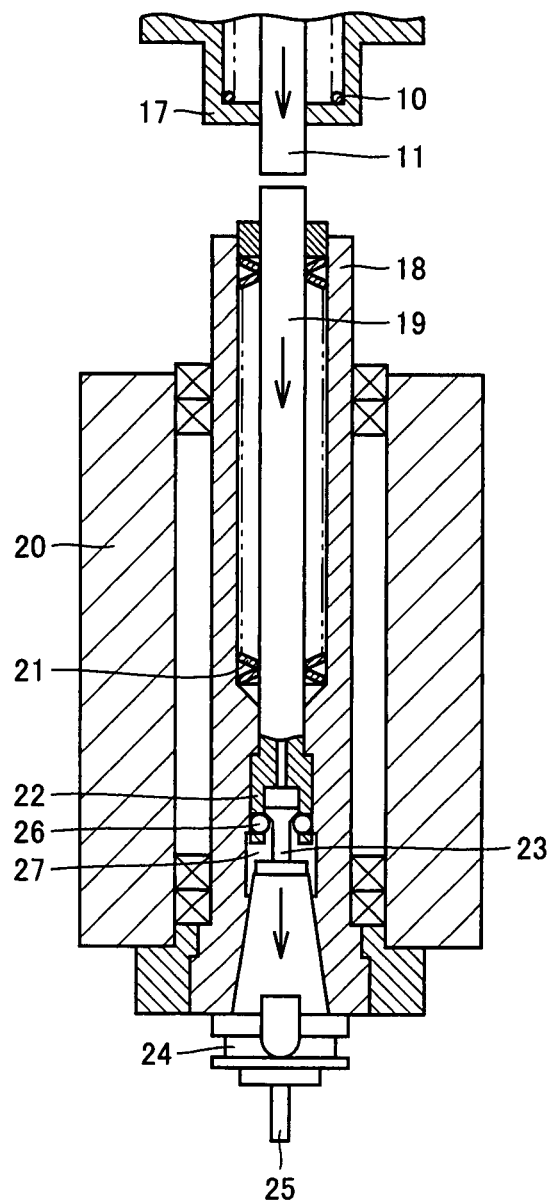
FIG. 3 is a sectional view showing exemplary structures of a spindle of a machine tool to which the tool unclamping device shown in FIG. 1 is applicable and a portion around the same.

As shown in FIG. 3, the spindle unit of the machine tool is arranged under tool unclamping device 1, so that a drawbar 19 described later is located immediately under output shaft 11 of the aforementioned tool unclamping device 1.

A spindle 18 of the machine tool has a hollow structure, and is inserted into a spindle head 20. A bearing is set between the outer peripheral surface of this spindle 18 and the inner peripheral surface of spindle head 20, so that spindle 18 is supported by this bearing.

Drawbar 19 is inserted into spindle 18, and a plurality of disc springs 21 are set around drawbar 19. These disc springs 21 can regularly urge drawbar 19 upward (toward tool unclamping device 1). Drawbar 19 is vertically movable, downwardly driven by moving output shaft 11 of tool unclamping device 1 downward for pressing the drawbar, and can be upwardly driven with urging force (elastic force) of disc springs 21 by raising output shaft 11.

A collet 22 is provided on the lower end of drawbar 19. In the example shown in FIG. 3, balls 26 are mounted on collet 22. A recess 27 is provided on the inner peripheral surface of spindle 18, so that the forward end of collet 22 is receivable in recess 27 when output shaft 11 of tool unclamping device 1 presses and downwardly moves drawbar 19. When the forward end of collet 22 moves into recess 27, the forward end of collet 22 opens and balls 26 held on collet 22 move outward. Thus, the tool is released from a clamped state so that an unclamped state of the tool is implemented.

A tapered portion is provided on the lower end of the inner peripheral surface of spindle 18, so that a tool holder 24 can be held on spindle 18 in contact with this tapered portion, as shown in FIG. 3. Tool holder 24 has a pull stud 23, and the aforementioned collet 22 can clamp and hold the forward end of this pull stud 23. Tool holder 24 holds a tool 25.

Operations of tool unclamping device 1 having the aforementioned structure are now described with reference to FIGS. 4 to 9.

First, an operation of unclamping tool 25 is described. Motor 3 is operated from the initial state shown in FIG. 2, for slightly rotating/driving eccentric cam 8 along arrow 28 shown in FIG. 4 through the power transmission mechanism. This unclamping operation can be started from the state shown in FIG. 4 slightly rotating eccentric cam 8 from the initial state shown in FIG. 2.

Figure 4:
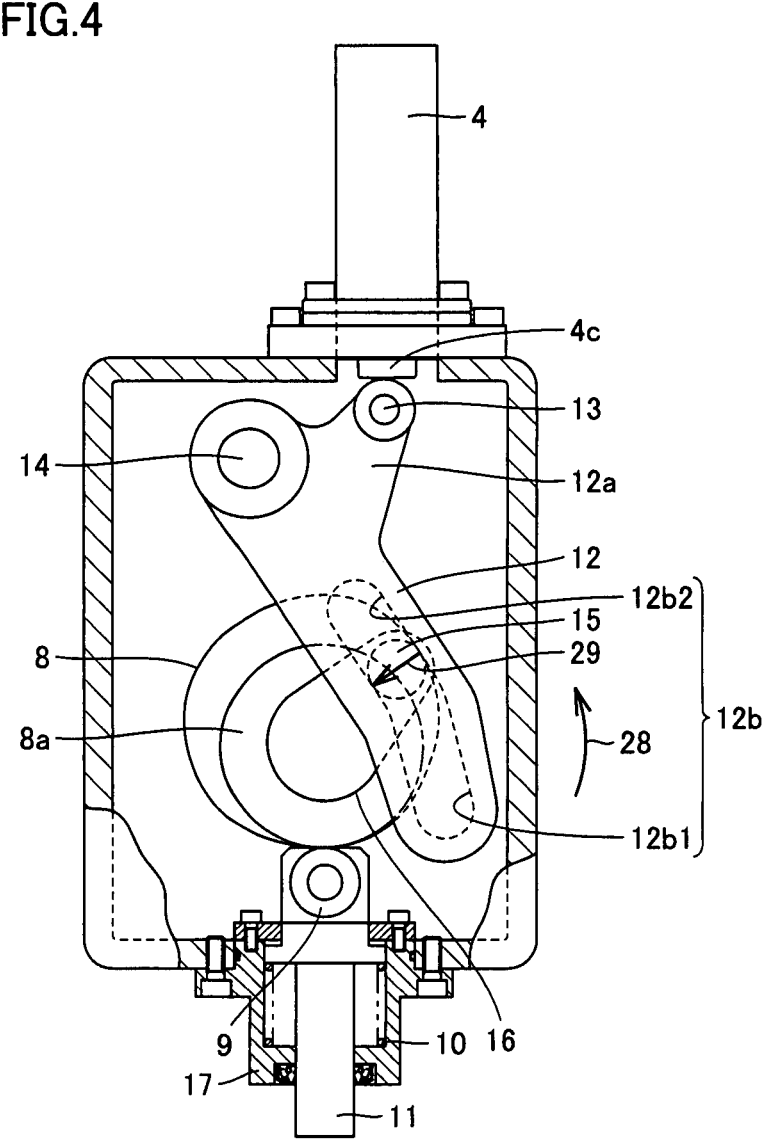
FIG. 4 illustrates a first stage of an unclamping operation in the tool unclamping device shown in FIG. 1.
Figure 5:
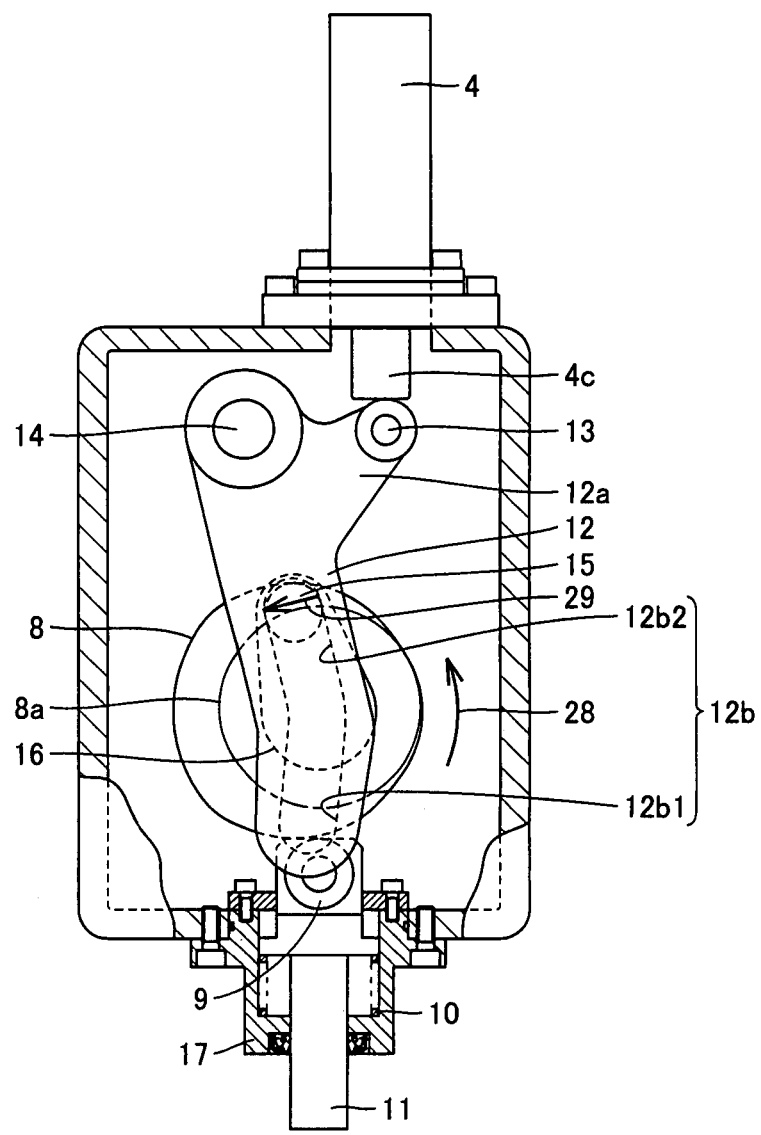
FIG. 5 illustrates a second stage of the unclamping operation in the tool unclamping device shown in FIG. 1.

Motor 3 is further operated from the state shown in FIG. 4, for rotating/driving eccentric cam 8 along arrow 28, as shown in FIG. 5. While pressing force (auxiliary power) from gas cylinder 4 acts on branch 12a of lever 12 through pressing portion 4c and cam follower 13 at this time, force of a direction shown by arrow 29 can be worked on coupling pin 15 due to this pressing force. This force of the direction shown by arrow 29 has a component of the same direction as that shown by arrow 28 as shown in FIGS. 4 and 5, whereby force of the same direction as that shown by arrow 28 can be worked on coupling pin 15 through the pressing force (auxiliary power) from gas cylinder 4. In other words, eccentric cam 8 can be rotated/driven in the direction along arrow 28 with both of the power from motor 3 and the auxiliary power from gas cylinder 4. Consequently, output shaft 11 can be projected downward beyond the state shown in FIG. 4, as shown in FIG. 5.

Figure 6:
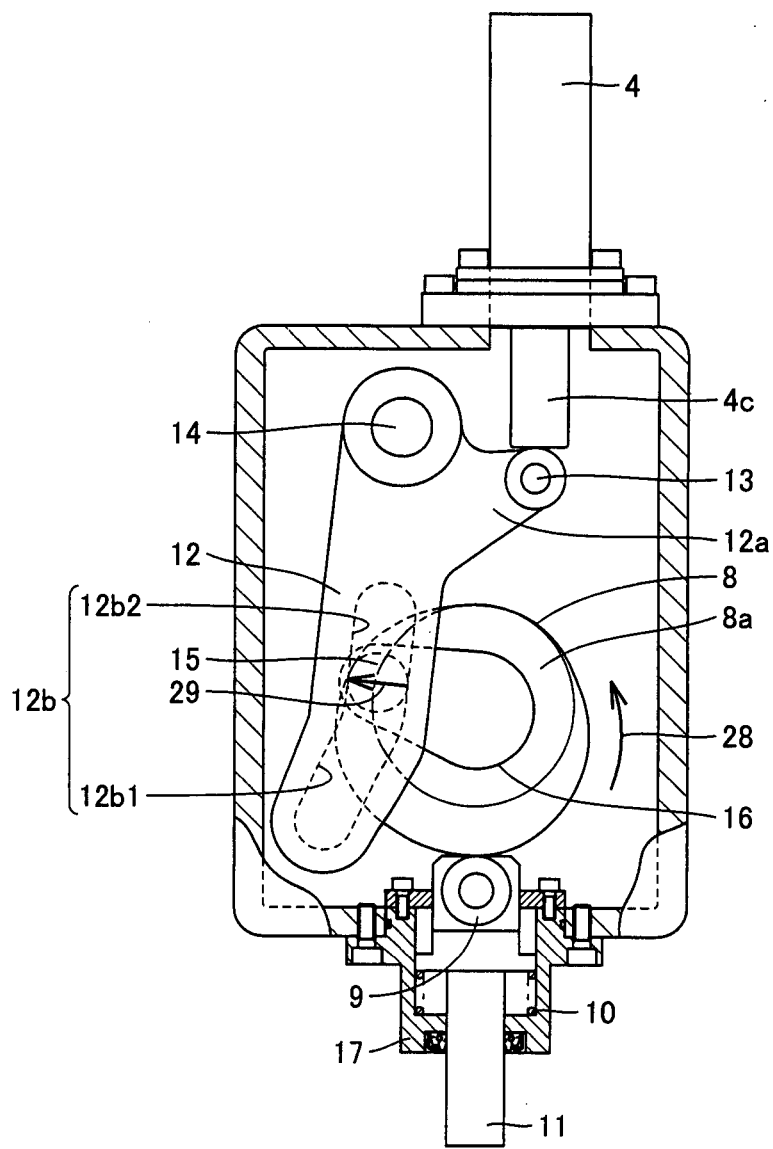
FIG. 6 illustrates a third stage of the unclamping operation in the tool unclamping device shown in FIG. 1.

Thereafter eccentric cam 8 is further rotated/driven along arrow 28 with both of the power from motor 3 and the auxiliary power from gas cylinder 4 as shown in FIG. 6, so that output shaft 11 further protrudes downward beyond the state shown in FIG. 5. At this time, pressing portion 4c of gas cylinder 4 further protrudes beyond the state shown in FIG. 5.

Output shaft 11 is projected downward as hereinabove described, so that output shaft 11 can downwardly press drawbar 19 provided in spindle 18 shown in FIG. 3 and can lower drawbar 19 by a prescribed quantity against the urging force (elastic force) from disc springs 21. Thus, the forward end of collet 22 can be moved into recess 27 shown in FIG. 3, so that pull stud 23 of tool holder 24 can be released from the state clamped by collet 22. Consequently, tool 25 held by tool holder 24 can be so unclamped that tool 25 can be exchanged.

An operation of releasing tool 25 from the unclamped state and bringing the same into a clamped state is now described.

Figure 7:
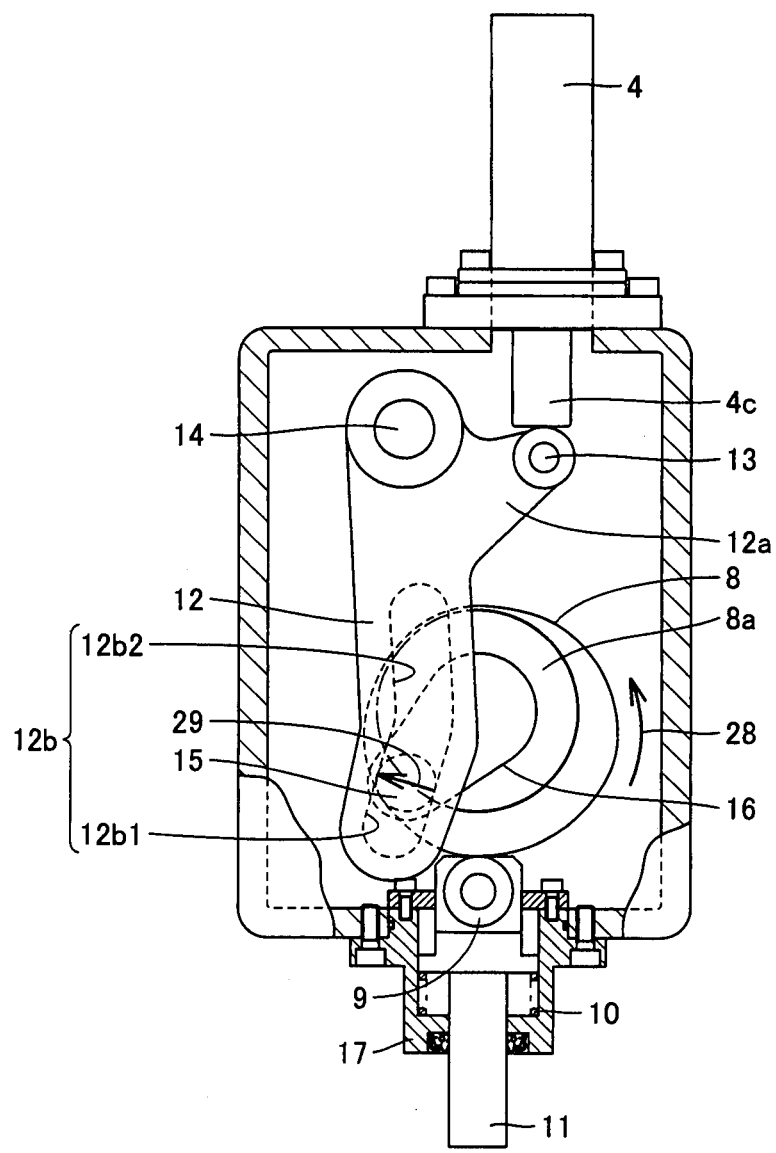
FIG. 7 illustrates a first stage of a clamping operation in the tool unclamping device shown in FIG. 1.

Motor 3 is further operated from the state shown in FIG. 6 for rotating/driving eccentric cam 8 along arrow 28, thereby entering a state shown in FIG. 7. The operation of clamping tool 25 can be started from this state.

Figure 8:
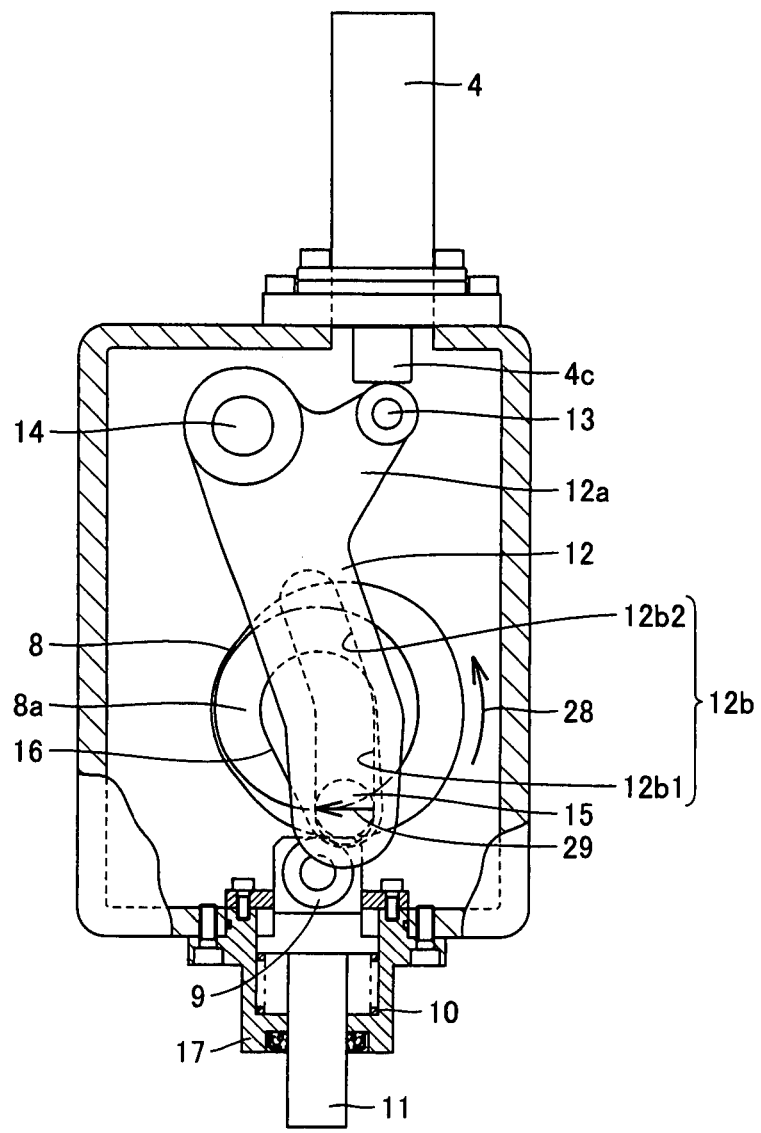
FIG. 8 illustrates a second stage of the clamping operation in the tool unclamping device shown in FIG. 1.

Motor 3 is further operated from the state shown in FIG. 7, for rotating/driving eccentric cam 8 along arrow 28, as shown in FIG. 8. While the pressing force (auxiliary power) from gas cylinder 4 still acts on branch 12a of lever 12 through pressing portion 4c and cam follower 13 in this stage, the force acting on coupling pin 15 through this pressing force acts oppositely to the force along arrow 28 obtained from motor 3, as shown by arrow 29 in FIGS. 7 and 8.

However, eccentric cam 8 can be rotated/driven in the direction shown by arrow 28, by setting the power obtained from motor 3 to a value greater than the pressing force (auxiliary power) from gas cylinder 4. Further, the clamping operation requires no large power capable of lowering output shaft 11 against the urging force of coiled spring 10 but the power necessary for rotating/driving eccentric cam 8 may be sufficiently small as compared with that for the unclamping operation. Therefore, eccentric cam 8 can be rotated/driven along arrow 28 only with the power from motor 3. Consequently, the large-diametral portion (bulging portion bulging outward in the radial direction: pressing portion) in eccentric cam 8 separates from cam follower 9, so that output shaft 11 can be moved upward beyond the state shown in FIG. 7 mainly with the urging force of coiled spring 10. At this time, pressing portion 4c of gas cylinder 4 is thrust into the casing of gas cylinder 4 beyond the state shown in FIG. 7.

Figure 9:
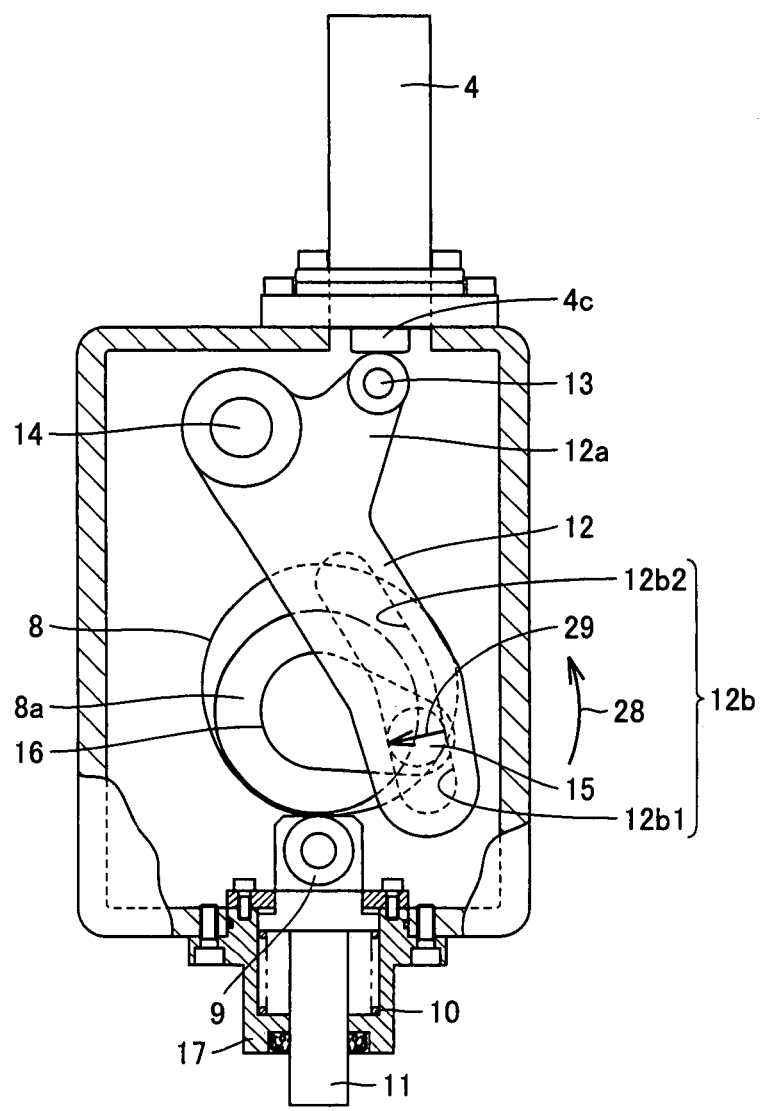
FIG. 9 illustrates a third stage of the clamping operation in the tool unclamping device shown in FIG. 1.

Thereafter eccentric cam 8 is further rotated/driven along arrow 28 mainly with the power from motor 3, as shown in FIG. 9. Thus, output shaft 11 is further moved upward beyond the state shown in FIG. 8, while pressing portion 4c of gas cylinder 4 can be further thrust into the casing of gas cylinder 4 beyond the state shown in FIG. 8.

The downward pressing force from output shaft 11 can be prevented from application to drawbar 19 in spindle 18 shown in FIG. 3 by moving output shaft 11 upward as described above. Thus, drawbar 19 can be raised by the urging force of disc springs 21, so that the forward end of collet 22 can be pulled up from recess 27 shown in FIG. 3. Consequently, collet 22 can clamp pull stud 23 in tool holder 24, so that tool 25 can be held on spindle 18 along with tool holder 24.

Figure 11:
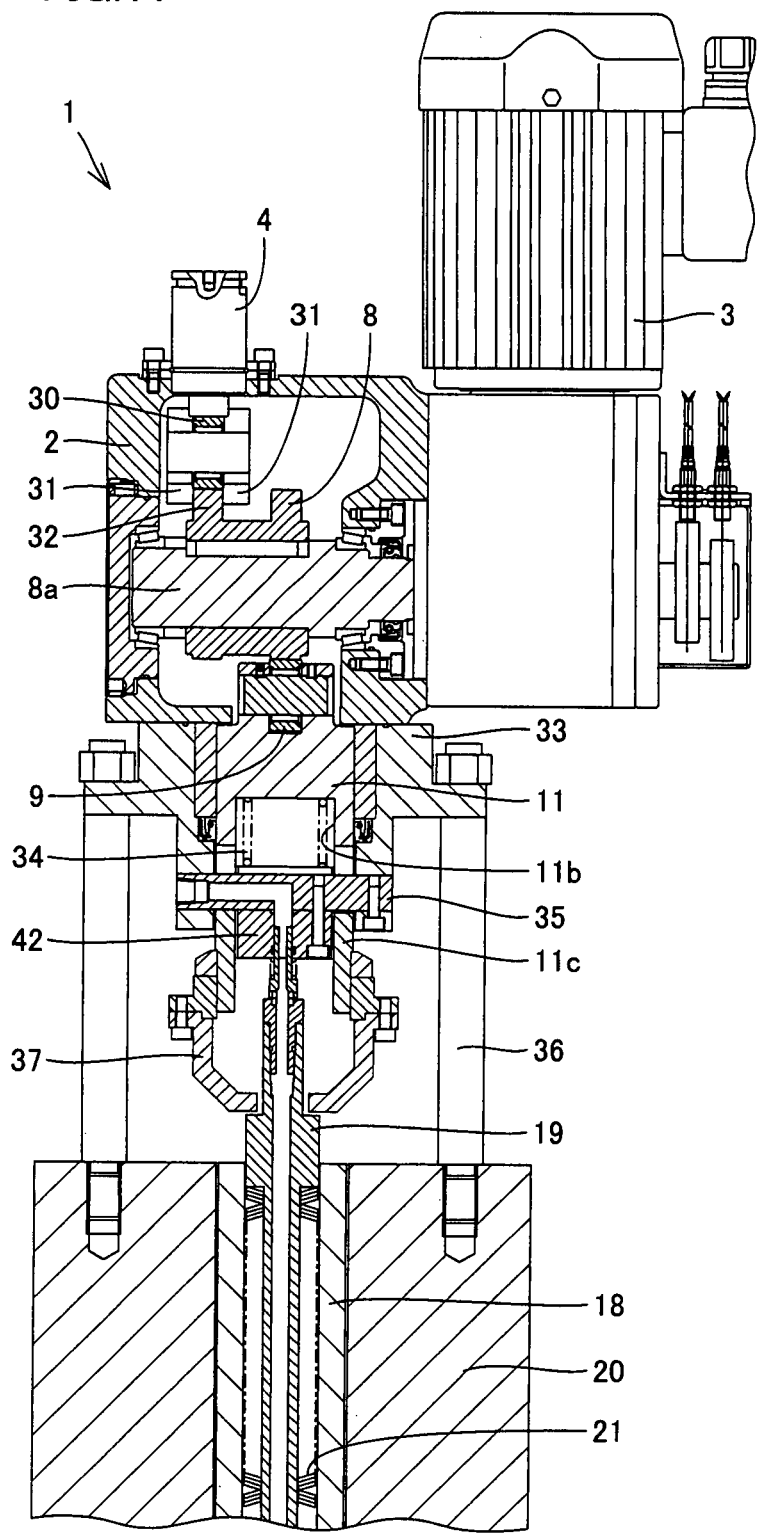
FIG. 11 is a partially fragmented front elevational view partially showing a tool unclamping device according to another embodiment of the present invention.
Figure 12:
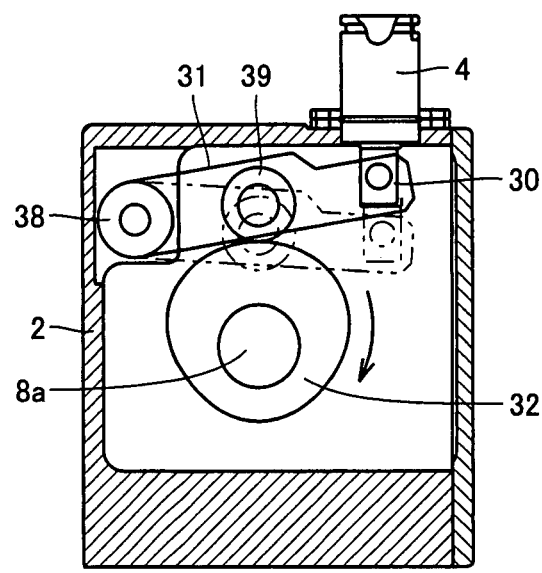
FIG. 12 is a sectional view partially showing the tool unclamping device shown in FIG. 11.

Another embodiment of the present invention and a modification thereof are now described with reference to FIGS. 11 to 14. FIG. 11 is a partially fragmented sectional view of a tool unclamping device 1 according to another embodiment of the present invention, and FIG. 12 is a sectional view of a casing 2 of tool unclamping device 1 shown in FIG. 11 as viewed from a side portion.

As shown in FIG. 11, tool unclamping device 1 comprises casing 2, a motor 3, a gas cylinder 4, a frame 33, a spindle 18, a drawbar 19, a spindle head 20 and disc springs 21.

Various elements functioning as a power transmission mechanism are incorporated into casing 2. More specifically, a rotary shaft 8a rotatably supported by casing 2, an eccentric cam (first eccentric cam: plate cam) 8 and an auxiliary eccentric cam (second eccentric cam: plate cam) 32 mounted on the outer periphery of this rotary shaft 8a, a lever 31, cam followers 30 and 39 mounted on this lever 31 and a cam follower 9 pressed against eccentric cam 8 and held on an output shaft 11 are set in casing 2.

Eccentric cam 8 and auxiliary eccentric cam 32 rotate along with rotary shaft 8a. Eccentric cam 8 and auxiliary eccentric cam 32, integrated with each other in the example shown in FIG. 11, may alternatively be separated from each other. While eccentric cam 8 and auxiliary cam 32 have substantially identical shapes (substantially identical contour curves) in the example shown in FIG. 11, the shapes of eccentric cam 8 and auxiliary cam 32 may alternatively be rendered different from each other. Further, it is also conceivable to render the sizes of eccentric cam 8 and auxiliary cam 32 different from each other. For example, eccentric cam 8 and auxiliary cam 32 may have similar shapes. While the displacements of eccentric cam 8 and auxiliary eccentric cam 32 at respective angles of rotation coincide with each other in the example shown in FIG. 11, the displacements of eccentric cam 8 and auxiliary eccentric cam 32 at the respective angles of rotation may alternatively be rendered different from each other. While eccentric cam 8 and auxiliary eccentric cam 32 are provided on the same shaft in the example shown in FIG. 11, these may alternatively be provided on different rotary shafts respectively so that the rotary shafts are connected with each other through gears or the like to be capable of mutually transmitting power.

Lever 31, rotatably set in casing 2 through a shaft portion 38, is formed by combining a pair of platelike members with each other, as shown in FIGS. 11 and 12. This lever 31 is arranged in a space between gas cylinder 4 and auxiliary eccentric cam 32, and provided with cam followers 30 and 39 on the forward end and a central portion respectively. In this specification, this "central portion" indicates a portion located between the forward end and shaft portion 38 in lever 31.

Cam follower 30, pressed by a pressing portion of gas cylinder 4, functions as an auxiliary power working portion of lever 31. Therefore, an arbitrary structure other than cam follower 30 is alternatively employable so far as the same can be pressed by the pressing portion of gas cylinder 4.

On the other hand, cam follower 39 functions as a pressing portion transmitting auxiliary power from gas cylinder 4 to auxiliary eccentric cam 32 by pressing auxiliary eccentric cam 32. Therefore, an arbitrary structure other than cam follower 39 is alternatively employable so far as the same can attain this function. The position for setting cam follower 39, substantially at the center of lever 31 in the example shown in FIG. 12, may simply be located between shaft portion 38 and cam follower 30, and cam follower 39 may be provided on a position closer to either shaft portion 38 or cam follower 30. Thus, cam follower 39 is so arranged between shaft portion 38 and cam follower 30 that large auxiliary power can be supplied to auxiliary eccentric cam 32 also when the auxiliary power output from gas cylinder 4 is at a relatively small value.

From this point of view, it can be said that cam follower 39 is preferably arranged on a position closer to shaft portion 38.

In the example shown in FIG. 11, eccentric cam 8 presses output shaft 11 through cam follower 9. This output shaft 11 has a recess 11b and a leg 11c, and is inserted into frame 33. Leg 11c is provided with a through hole, for receiving a plate 35 in this through hole. Plate 35 is fixed to frame 33, and this frame 33 is supported by spindle head 20 through support bolts 36. The aforementioned plate 35 is provided with an oil passage, so that oil can be supplied into spindle 18 through drawbar 19.

A support member 42 is set in recess 11b of output shaft 11, and plate 35 is so set as to also pass through this support member 42. A coiled spring 34 is set between support member 42 and output shaft 11, so that support member 42 supports an end of coiled spring 34 and urges output shaft 11 toward eccentric cam 8 with coiled spring 34.

The width (axial width of output shaft 11: the vertical width in FIG. 11) of the through hole provided in leg 11c of output shaft 11 is greater than the thickness of plate 35, whereby output shaft 11 is movable in the axial direction (vertical direction in FIG. 11). Leg 11c is so provided on the forward end with a pressing portion 37 that the same can press drawbar 19 with this pressing portion 37. The remaining structure is substantially similar to that of the aforementioned embodiment.

Operations of tool unclamping device 1 according to this embodiment are now described.

Motor 3 is operated from the state shown in FIG. 11, for rotating/driving eccentric cam 8 and auxiliary eccentric cam 32 along arrow shown in FIG. 12 through the power transmission mechanism. Thus, output shaft 11 can be pressed through cam follower 9. At this time, the pressing force from gas cylinder 4 acts on auxiliary eccentric cam 32 through cam follower 30 of lever 31, so that auxiliary eccentric cam 32 is rotated/driven also by this pressing force. This serves as auxiliary torque, so that output shaft 11 can be pressed with both of running torque from motor 3 and the auxiliary torque. Thus, output shaft 11 can be moved downward in FIG. 11, for pressing drawbar 19 downward through pressing portion 37.

When drawbar 19 is lowered by a prescribed quantity against spring force (elastic force) from disc springs 21, the forward end of a collet (not shown) can be moved into a recess and opened so that a pull stud in a tool holder can be released from a state clamped by the collet. Consequently, a tool held by the tool holder can be unclamped so that the tool can be exchanged.

When motor 3 is further operated from the aforementioned state for rotating/driving eccentric cam 8 along arrow in FIG. 12, the pressing force from eccentric cam 8 to output shaft 11 is gradually reduced. While the pressing force from gas cylinder 4 still acts on auxiliary eccentric cam 32 in this stage, the power obtained from motor 3 is greater than the pressing force from gas cylinder 4, whereby auxiliary eccentric cam 32 can be rotated/driven along arrow in FIG. 12 with eccentric cam 8. Consequently, a large-diametral portion (bulging portion bulging outward in the radial direction: pressing portion) in eccentric cam 8 separates from cam follower 9, so that output shaft 11 can be moved upward with the urging force of coiled spring 11b.

Output shaft 11 is upwardly moved in this manner so that no downward pressing force from output shaft 11 is supplied to drawbar 19 and drawbar 19 can be raised by the spring force of disc springs 21. Thus, the forward end of the collet can be pulled up from the aforementioned recess, so that the collet can clamp the pull stud in the tool holder and the tool can be held on spindle 18 along with the tool holder.

A modification of auxiliary eccentric cam 32 is now described with reference to FIG. 13.

Figure 13:
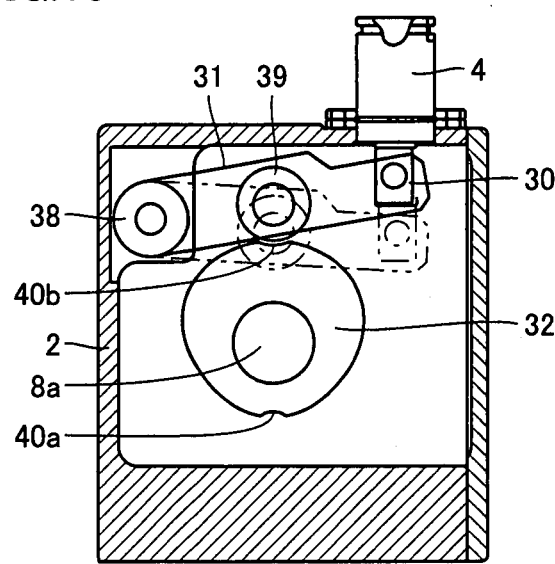
FIG. 13 is a sectional view showing a modification of the structure shown in FIG. 12.

As shown in FIG. 13, recesses 40a and 40b may be provided on the surface of auxiliary eccentric cam 32. These recesses 40a and 40b partially receive cam follower 39 serving as the pressing portion, and the angle of rotation of auxiliary eccentric cam 32 can be sensed by detecting the positions of recesses 40a and 40b. Two recesses 40a and 40b are provided on positions having angles of rotation deviating by 180° from each other in the example shown in FIG. 13, whereby an initial position having an angle of rotation of 0° and a position rotating by 180° from the initial position can be detected, for example. Further, eccentric cam 8 and auxiliary eccentric cam 32 have identical shapes and coinciding angles of rotation in the example shown in FIG. 13, whereby the angle of rotation of eccentric cam 8 can also be easily sensed. The number of the recesses is arbitrary settable. For example, it is also conceivable to provide four recesses on positions having angles of rotation deviating by 90° from each other.

A modification of this embodiment is now described with reference to FIG. 14.

Figure 14:
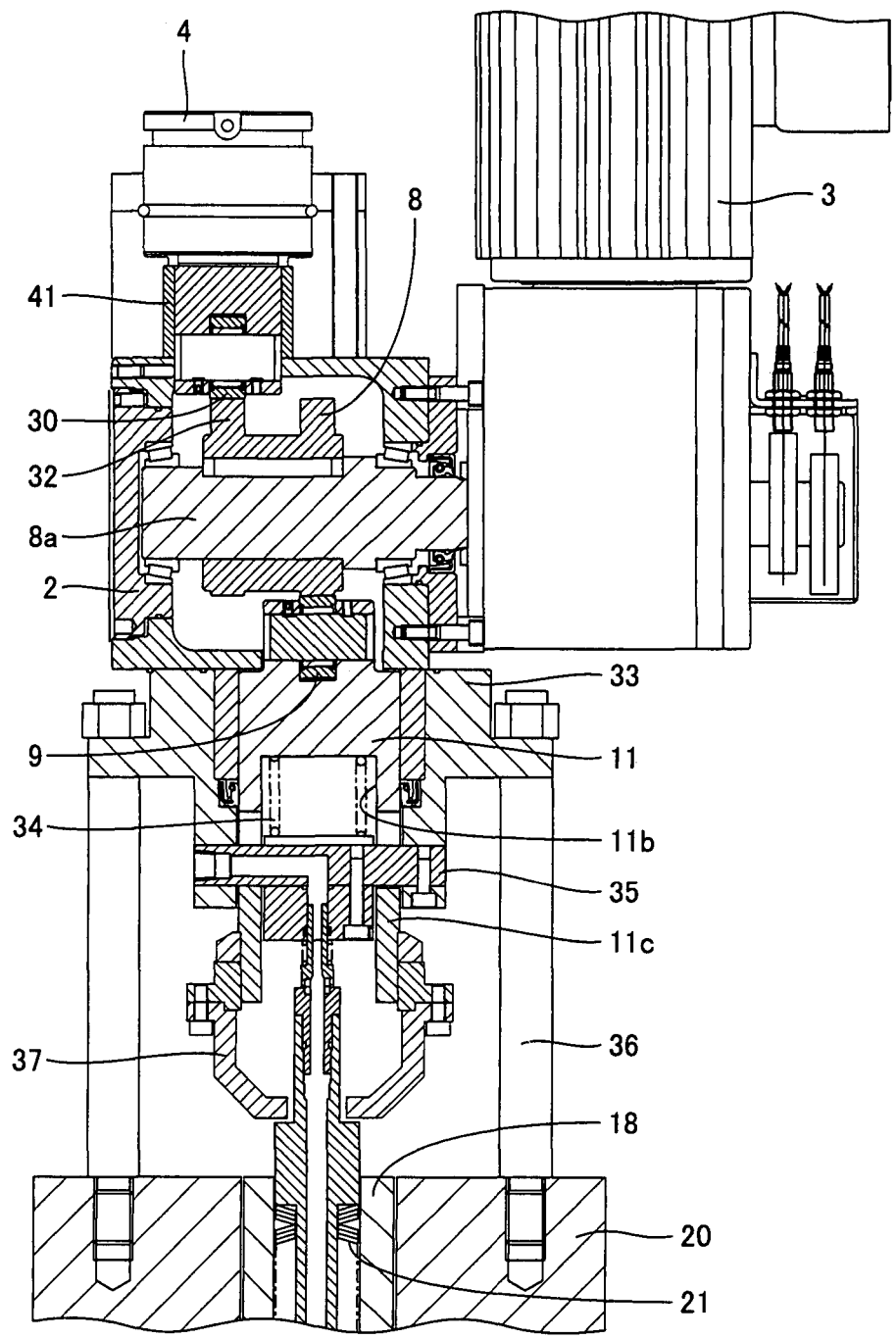
FIG. 14 is a partially fragmented sectional view showing a modification of the tool unclamping device shown in FIG. 11.

As shown in FIG. 14, auxiliary power from a gas cylinder 4 directly acts on an auxiliary eccentric cam 32 not through a lever but through a holding member 41 holding a cam follower 30 according to this modification. Further, a cylindrical guide wall guiding holding member 41 is projectingly provided on the upper surface of a casing 2. The remaining structure is basically similar to that of the aforementioned embodiment.

When auxiliary eccentric cam 32 is arranged immediately under gas cylinder 4 for working auxiliary power as in this modification, necessary auxiliary power can be worked on auxiliary eccentric cam 32 with a simple mechanism, although it is difficult to work large power similarly to the case of working the auxiliary power through the lever. Also in the case of this modification, the angles of rotation of auxiliary eccentric cam 32 and an eccentric cam 8 can be sensed by providing recesses for detecting the positions of rotation on the surface of auxiliary eccentric cam 32.

While the embodiments of the present invention have been described in the above, a proper combination of the structures of the aforementioned embodiments is planned from the outset.

The embodiments disclosed this time must be considered as illustrative in all points and not restrictive. The scope of the present invention is shown by the scope of claim for patent, and all modifications in the meaning and range equivalent to the scope of claim for patent are included.

Industrial Availability

The present invention is effectively applied to a tool unclamping device usable for exchanging a tool mounted on a spindle of a machine tool.

The invention claimed is:

1. A tool unclamping device capable of unclamping a tool clamped to a spindle of a machine tool, comprising:
   a casing;
   an output shaft set on said casing and capable of outputting power necessary for unclamping said tool;
   a power source capable of supplying power for driving said output shaft to unclamp said tool;
   a power transmission mechanism transmitting the power from said power source to said output shaft; and
   an auxiliary power source capable of supplying auxiliary power to said power transmission mechanism to assist the power source to unclamp said tool, wherein
   said power transmission mechanism includes a rotary shaft provided with:

a first eccentric cam, provided eccentrically with respect to a rotational axis of the rotary shaft, pressing said output shaft, and a second eccentric cam, provided eccentrically with respect to the rotational axis, transmitting the auxiliary power from said auxiliary power source to said first eccentric cam.

2. The tool unclamping device according to claim 1, wherein said auxiliary power source includes a gas cylinder supplying pressure from internally stored gas to said power transmission mechanism.

3. The tool unclamping device according to claim 1, wherein said power transmission mechanism includes a lever, rotatably set between said auxiliary power source and said second eccentric cam, the lever being rotatably supported by said casing at a first end thereof, and the auxiliary power from said auxiliary power source acts on a second end of said lever so that said auxiliary power acts on said second eccentric cam through a pressing portion located between the first end and said second end of said lever.

4. The tool unclamping device according to claim 3, wherein a recess partially receiving said pressing portion is provided on a surface of said second eccentric cam.

5. A tool unclamping device capable of unclamping a tool clamped to a spindle of a machine tool, comprising:

a casing;

an output shaft set on said casing and capable of outputting power necessary for unclamping said tool;

a power source capable of supplying power for driving said output shaft to unclamp said tool;

a power transmission mechanism transmitting the power from said power source to said output shaft; and an auxiliary power source capable of supplying auxiliary power to said power transmission mechanism to assist said power source to unclamp said tool, wherein said power transmission mechanism has a rotary shaft provided with:

an eccentric cam, provided eccentrically with respect to a rotational axis of the rotary shaft, rotated by the power from said power source and said auxiliary power source for reciprocating said output shaft, a crank arm that rotates with said eccentric cam, a coupling member provided on said crank arm, and a rotatable lever mechanically connected to said crank arm through said coupling member, wherein said eccentric cam is rotated by providing the auxiliary power from said auxiliary power source on said lever.

6. The tool unclamping device according to claim 5, wherein said lever is provided with a branch so that the auxiliary power from said auxiliary power source acts on said branch.

7. The tool unclamping device according to claim 5, wherein said lever is provided with a recess receiving said coupling member, and said recess includes a first portion receiving said coupling member when clamping said tool, and a second portion extending in a direction intersecting with said first portion for receiving said coupling member, wherein rotation of said crank arm causes said coupling member to move from said first portion to said second portion when unclamping said tool.

* * * * *

UNITED STATES PATENT AND TRADEMARK OFFICE
CERTIFICATE OF CORRECTION

| | |
|---|---|
| PATENT NO. | : 8,419,325 B2 |
| APPLICATION NO. | : 11/794378 |
| DATED | : April 16, 2013 |
| INVENTOR(S) | : Ichiro Kitaura et al. |

It is certified that error appears in the above-identified patent and that said Letters Patent is hereby corrected as shown below:

ON THE TITLE PAGE:

At item (86), change the PCT No. from "PCT/JP2006/018380" to --PCT/JP2006/318380--.

Signed and Sealed this
Twenty-seventh Day of August, 2013

Teresa Stanek Rea
*Acting Director of the United States Patent and Trademark Office*